United States Patent
Lee et al.

[11] Patent Number: 6,036,183
[45] Date of Patent: Mar. 14, 2000

[54] BI-STATE HYDRAULIC ENGINE MOUNT

[75] Inventors: Chiung Alex Lee, Centerville; Jay Michael Shores, Miamisburg; Gary Lee Johnston, Pleasant Hill; William Charles Kruckemeyer, Beavercreek; Mark Wayne Long, Bellbrook; Frederick Clem Miller, Beavercreek, all of Ohio

[73] Assignee: General Motors Corporation, Detroit, Mich.

[21] Appl. No.: 09/105,805

[22] Filed: Jun. 28, 1998

[51] Int. Cl.[7] .................................................. F16F 13/00
[52] U.S. Cl. .............................. 267/140.14; 267/140.13; 267/219
[58] Field of Search ................... 267/140.14, 140.13, 267/140.15, 140.11, 140.12, 219, 220; 180/300, 312, 902; 248/562, 636, 638, 550

[56] References Cited

U.S. PATENT DOCUMENTS

| | | | |
|---|---|---|---|
| 4,383,679 | 5/1983 | Kakimoto | 267/140.13 |
| 4,391,435 | 7/1983 | Pham | 267/140.13 |
| 4,783,062 | 11/1988 | Hamberg et al. | 267/140.14 |
| 4,877,225 | 10/1989 | Noguchi et al. | 267/140.14 |
| 4,901,986 | 2/1990 | Smith | 267/140.14 |
| 5,246,213 | 9/1993 | Zup et al. | 267/140.14 |
| 5,370,375 | 12/1994 | Kojima | 267/140.14 |
| 5,645,138 | 7/1997 | Tajima et al. | 267/140.11 |

*Primary Examiner*—Douglas C. Butler
*Attorney, Agent, or Firm*—Robert M. Sigler

[57] ABSTRACT

A hydraulic mount is operable in soft and firm modes and includes a valve positioned at the partition between the working chamber and the reservoir. A normally open fluid path extends through the partition and opens between the working chamber and the reservoir for soft operational characteristics useful in attenuating low amplitude vibrations. The valve body and the partition together define a control chamber in the fluid path. The control chamber is open to the reservoir through lateral openings in the valve body so that fluid pressure in the control chamber is approximately at atmospheric pressure so that a small actuator can move the valve. When the valve is closed the fluid path is closed for firm operational characteristics in controlling large amplitude inputs such as those from torque transients.

6 Claims, 1 Drawing Sheet

BI-STATE HYDRAULIC ENGINE MOUNT

TECHNICAL FIELD

The present invention relates to hydraulic powertrain mounts and more particularly, to a bi-state hydraulic engine mount that provides relatively soft performance characteristics to attenuate routine low amplitude vibrations and provides relatively hard performance characteristics to attenuate large amplitude torque transients.

BACKGROUND OF THE INVENTION

Conventional powertrain mounts exist in many varieties and generally operate to provide engine isolation while concurrently controlling engine motion. One common type of mount is the elastomeric mount. The typical damping versus frequency performance curve for an elastomeric mount is relatively constant. This type of "plain" elastomeric mount provides a fairly constant damping rate across the range of frequencies typically encountered to in a given application. The level of damping provided is typically increased or decreased for the application by pre-selecting an elastomeric material having different properties and physical dimensions. Once the mount is constructed, set damping rate characteristics are provided regardless of the actual operating conditions that the mount encounters. Therefore, another general characteristic of a typical plain elastomeric mount, is that it provides a relatively uniform damping rate regardless of vibrational input amplitude, or one that decreases slightly with amplitude. It has been recognized as desirable to provide a mount that exhibits relatively high damping responses at low frequencies and relatively low damping responses at high frequencies. It has also been recognized that a desirable operating characteristic of a mount is to have a high damping coefficient for relatively high amplitude inputs and a relatively low damping coefficient for lower amplitude inputs. In part, to provide these desirable operating characteristics the hydraulic mount was developed.

The typical hydraulic mount includes a pumping chamber surrounded by relatively thick elastomeric walls with an orifice track opening to the chamber and extending to a reservoir that is typically surrounded by a flexible rubber diaphragm. The reservoir is typically located on the opposite side of a partition from the pumping chamber. During compression operation, fluid is pressurized in the pumping chamber and is caused to flow through the orifice track to the reservoir. During rebound operation, fluid is drawn back to the pumping chamber from the reservoir. The geometry of the pumping chamber, orifice track and reservoir are tuned so that the fluid in the orifice track resonates at certain frequencies. This is used to provide a peak damping effect at a selected frequency to reduce vehicle harshness from road induced vibrations. Generally, hydraulic mounts are viewed as preferable in many applications. In comparing the response achieved by the plain elastomeric mount to that achieved by the hydraulic mount, it is known that a hydraulic mount can be utilized to significantly reduce wheel hop induced vibrations, but can also result in an overall response that has the undesirable consequence of a slightly harsher ride characteristic. One hindrance in applying the hydraulic mount to certain vehicles is that in order to adequately control engine motion during torque transients, they don't provide a sufficiently soft characteristic to attenuate harsh running engine vibrations. Accordingly, it would be preferable if the hydraulic mount could be applied to a wider range of applications including those where engine generated vibration isolation must be maximized.

A known manner of achieving additional incremental increases in the performance characteristics of hydraulic mounts at selected frequency ranges, is to add electronic control to the dynamic characteristics of the mount to provide a preprogrammed active ability to change the response of the mount to optimize damping of the encountered vibrations. In a known type of electronically controlled mount, a relatively powerful solenoid actuator is provided to vary an orifice, effecting fluid flow control between the pumping chamber and reservoir of the mount. While this solution to the aforementioned drawbacks is relatively successful, it tends to be rather costly and typically requires a mount of relatively large size. This increased size and complexity leads to significant restrictions in the number of applications within which the controlled mount can be utilized. Accordingly, a new type of controllable mount is required that is relatively simple, while having the capability to provide soft operating characteristics in combination with hard operating characteristics for torque transient conditions.

SUMMARY OF THE INVENTION

An aspect of the present invention resides in providing a hydraulic mount that normally provides relatively soft operating characteristics for attenuating commonly encountered low amplitude vibrational inputs. This is achieved by allowing relatively free fluid pumping operation within the mount so that the mount deflects relatively easily, minimizing the transmission of forces from the suspended mass. Through an integral control valve, the mount is continuously capable of providing relatively hard operating characteristics for controlling motion during transient high amplitude inputs. This is achieved by interrupting fluid flow from within the mount so that deflection of the mount causes an increase in pressure contributing to an increase in stiffness. To provide these performance characteristics in a competitive design, the present invention uses a balanced-flow valve that closes to interrupt fluid pumping operation. Advantageously, radial flow causes the hydraulic forces acting on the valve to be balanced so that they cancel, producing a low net force. This enables the use of a relatively compact, simple and less powerful actuator for the valve.

According to a preferred embodiment of the present invention described in greater detail herein, a hydraulic mount includes a first mounting element associated with an elastomeric wall. A partition engages the elastomeric wall and together with the elastomeric wall defines a working chamber. The size of the working chamber varies as the elastomeric wall is compressed and expanded by operation of the first mounting element and the partition moving closer together and farther apart. A reservoir is defined on an opposite side of the partition from the working chamber substantially by a relatively flexible diaphragm. The diaphragm includes an outside surface that is exposed to atmospheric pressure. A valve body is positioned at the partition providing a normally open fluid path that extends through the partition and opens between the working chamber and the reservoir. Fluid is contained in the working chamber, the reservoir and the fluid path, with the valve body and the partition together defining a control chamber in the fluid path that is open to the reservoir through a lateral opening in the valve body. Fluid pressure in the control chamber and fluid pressure in the reservoir are both continuously approximately at atmospheric pressure. When the control chamber is open to the working chamber, soft operating characteristics are provided. When the control chamber is closed off from the working chamber, hard operating characteristics are provided.

BRIEF DESCRIPTION OF THE DRAWINGS

The present invention will now be described, by way of example, with reference to the accompany drawing in which:

The FIGURE is a cross-sectional illustration of a hydraulic mount according to the present invention.

DESCRIPTION OF THE PREFERRED EMBODIMENT

Figure 1:
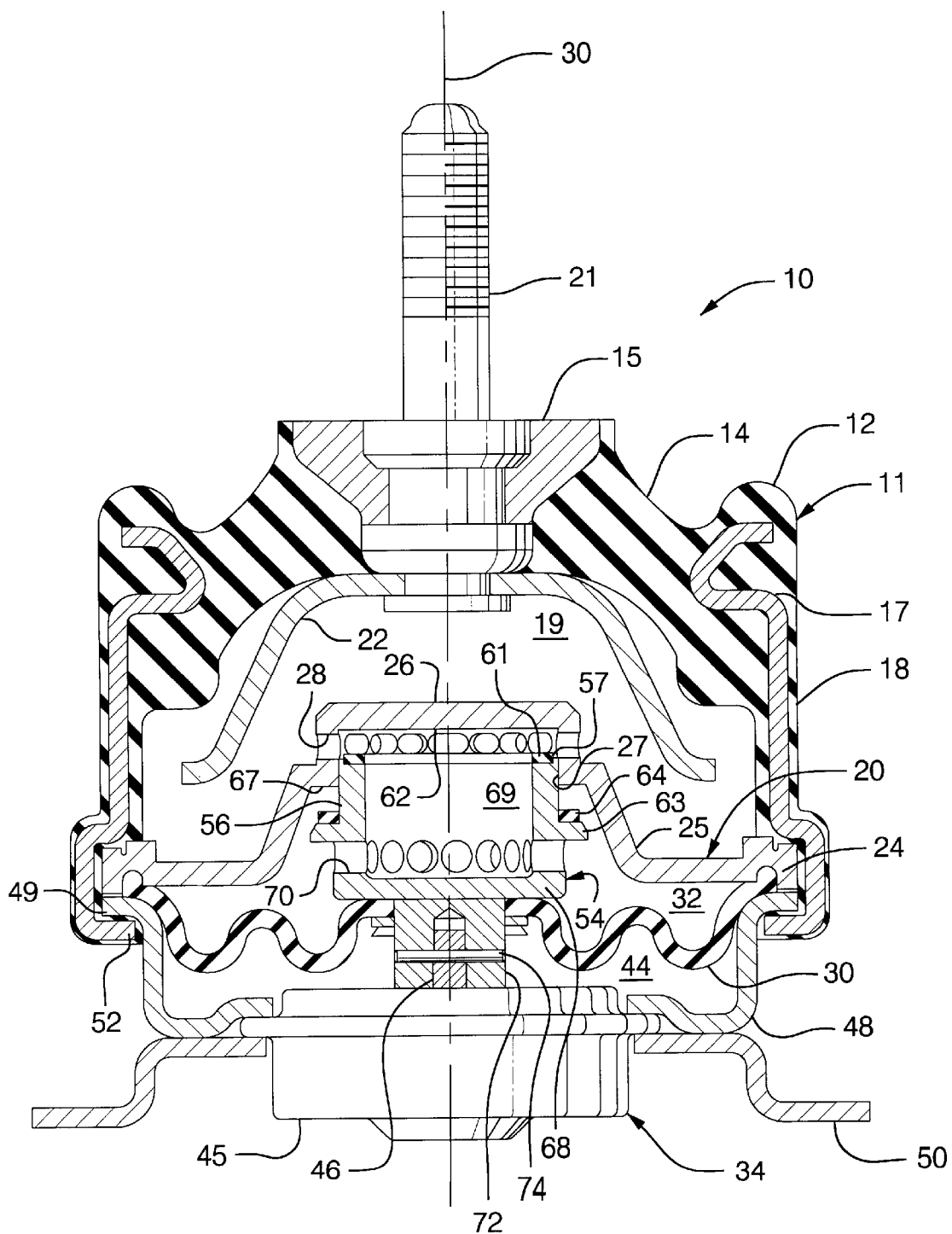

Referring to the drawings, illustrated in the FIGURE is a hydraulic mount 10. In general, the hydraulic mount 10 is intended to be employed in supporting vehicular powertrain components while reducing the transmission of vibrations between the powertrain and a vehicle body. In particular, hydraulic mount 10 is advantageously used in applications where harsh engine vibrations (generally at low amplitude), are common and are preferably attenuated through a softly performing mount. In addition, the mount 10 has the advantage of responding to support large amplitude inputs by providing firm operational characteristics when necessary. Typically encountered large amplitude inputs include those generated by torque transients resulting from transmission shifts especially "garage" shifts.

Hydraulic mount 10 includes a reinforced rubber body designated as molded assembly 11. Molded assembly 11 includes an elastomeric element 12, that provides desirable performance characteristics selected for a given application wherein the elastomeric element 12 exhibits a certain resiliency and hardness. Generally, elastomeric element 12 is provided in an annular configuration, although the shape can be varied as desired, and as dictated by the packaging requirements placed on the mount. Elastomeric element 12 includes a wall 14 that is set at an angle so that it diverges from the end adjacent first mounting element 15 to the end adjacent support 17 and is generally provided in the form of a truncated hollow cone. The elastomeric element 12 is molded or otherwise secured to the first mounting element 15, surrounds the rigid metal support 17 and includes an extension 18 that is adhered along the tortuous profile length of the support 17. A fluid filled working chamber 19 is defined within the molded assembly 11 and is closed by a partition 20. The first mounting element 15 carries a fastener 21, and a bell-shaped internal interlock 22 is secured to the fastener within the working chamber 19. The outer diameter of the internal interlock 22 is greater than the internal diameter of the support 17 so that it remains captive.

The partition 20 includes an outer rim 24 that is secured within the molded assembly 11. An angled wall 25 of the partition 20 supports an offset section 26 forming a recess 27 that opens away from the working chamber 19. A plurality of transverse openings 28 extend through the partition 20 at the recess 27 and are oriented perpendicular to the axis 30 of the mount 10. The transverse openings 28 are distributed around the offset section 26 so that forces resulting from fluid flow therethrough are radially balanced around the perimeter of recess 27. The partition 20 also includes a groove, within which a diaphragm 30 is secured, enclosing a substantially annular reservoir 32 that contains fluid and that is positioned on the opposite side of the partition from working chamber 19. The working chamber 19 and reservoir 32 are interconnected by a fluid path that extends through the partition 20.

An actuator 34 includes a power head 45 and a shaft 46 that extends into the reservoir area, with the powerhead 45 providing the motive force to move the shaft 46. The powerhead employs one of a variety of well known actuation mechanisms such as: a vacuum actuator, an air cylinder, a solenoid, a phase change actuator, a thermal actuator, or a bi-metal actuator. The type of mechanism is selected according to the application. The powerhead 45 is secured between a base plate 48 and a second mounting element 50. The base plate 48 surrounds the diaphragm 30 and defines an atmospheric pressure chamber 44 adjacent to the diaphragm 30. Base plate 48 is captured by the molded assembly 11 securing the diaphragm 30 within the groove in the partition 20. For the present embodiment, support 17, within the molded assembly 11, is generally annular in shape and includes a crimped arm 52, with the arm 52 and extension 18 of elastomeric element 12 closely secured around the partition 20 and the base plate 48 to hold the mount 10 together. The second mounting element 50 is secured to the base plate 48 through a conventional means.

A valve body 54 includes an annular wall 56 with a terminal end 57 that is received within the recess 27 of the partition 20 so that together the partition 20 and the valve body 54 provide the main valve elements for effecting closure of the fluid path between the working chamber 19 and the reservoir 32. The annular wall 56 includes a step at the terminal end 57 that carries a first annular seal 61. Seal 61 is engageable with the surface 62 of partition 20 within the recess 27. Valve body 54 also includes a projecting rib 63 that supports a second annular seal 64 around the annular wall 56. Seal 64 is engageable with the surface 67 of partition 20 at the offset section 26 between the recess 27 and the angled wall 25. The valve body 54 includes a solid wall 68 that is formed together with the annular wall 56 as one piece so that a control chamber 69 is defined between the valve body 54 and the partition 20. The control chamber 69 is continuously open to the reservoir 32 through a plurality of transverse openings 70 that are oriented substantially perpendicular to the axis 21, and that extend through the valve body 54 adjacent to the annular rib 63, so that the fluid pressure within the control chamber 69 is always substantially equal to the fluid pressure in the reservoir 32. Since the reservoir 32 is surrounded by flexible diaphragm 30, the fluid pressure in both the reservoir 32 and the control chamber 69 is at/substantially at atmospheric pressure.

The valve body 54 is engaged with the shaft 46 of actuator 34 by an arm 72 that extends through the diaphragm 30 and is bonded thereto. Arm 72 is connected to shaft 46 by a pressed-in pin 74. Through this construction, the valve body 54 and partition 20 elements are commonly supported on the second mounting element 50 by the base plate 48, with the first mounting element 15 being moveable relative to these elements by deflection of the elastomeric element 12. With the valve body 54 in the position shown, the working chamber 19 is open to the reservoir 32 through the transverse openings 28, control chamber 69, and transverse openings 70. In this soft mode of operation, the elastomeric element 12 is relatively easily deflected with fluid being simultaneously pumped through the fluid path between the working chamber 19 and the reservoir 32. To effect a firm mode of operation for the mount 10, the actuator is activated to move the shaft 46 and the connected valve body 54 toward the partition 20. Movement of the valve body 54 is effected with a relatively low-powered actuator since the fluid pressure at the wall 68 is essentially zero and the fluid pressure effected by flow through the transverse openings 28 is radially balanced around the annular wall 56 by the layout of the openings 28. The seal 61 is engaged with the surface 62 preventing the transmission of fluid between the control chamber 69 and the working chamber 19. Effectively simultaneously, the seal 64 is engaged with the surface 67 preventing any leakage of fluid between the working chamber 19 and the reservoir 32. By closing off the fluid path, the mount is rather rigid, in-that any deflection of the elastomeric element 12 occurs without moving fluid between the working chamber 19 and the reservoir 32. Since the fluid in the mount 10 is noncompressible, deflection of the mount 10 requires bulging of the elastomeric element 12, in particular at the angled wall 14. With the fluid path closed, high pressures generated in the working chamber 19 have little effect in applying forces that attempt to re-open the valve. This is due to the orientation of the openings 28.

Thus, the present invention provides a hydraulic mount that is operable in soft and firm modes and includes a valve positioned at the partition between the working chamber and the reservoir. A normally open fluid path extends through the partition and opens between the working chamber and the reservoir for soft operational characteristics useful in attenuating low amplitude vibrations. The valve body and the partition together define a control chamber in the fluid path. The control chamber is open to the reservoir through lateral openings in the valve body so that fluid pressure in the control chamber is approximately at atmospheric pressure so that a small actuator can move the valve. When the valve is closed the fluid path is closed for firm operational characteristics in controlling large amplitude inputs such as those from torque transients.

We claim:

1. A hydraulic mount comprising:
   a first mounting element associated with an elastomeric wall;
   a partition engaging the elastomeric wall and together with the elastomeric wall defining a working chamber wherein the size of the working chamber varies as the elastomeric wall is compressed and expanded by operation of the first mounting element and the partition moving closer together and farther apart;
   a reservoir defined on an opposite side of the partition from the working chamber substantially by a relatively flexible diaphragm, wherein the diaphragm includes an outside surface that is exposed to atmospheric pressure;
   a value body positioned at the partition providing a normally open fluid path extending through the partition and opening between the working chamber and the reservoir wherein a fluid is contained in the working chamber, the reservoir and the fluid path, wherein the valve body and the partition together define a control chamber in the fluid path wherein the control chamber is open to the reservoir through a lateral opening in the valve body so that a first fluid pressure in the control chamber is continuously approximately equal to a second fluid pressure in the reservoir that is approximately at atmospheric pressure; and
   an actuator engaging the valve body wherein the valve body includes an arm that extends through the diaphragm.

2. A hydraulic mount according to claim 1 wherein the partition includes a recess that receives the valve body and wherein the control chamber is openable to the working chamber through a lateral opening that extends through the partition at the recess.

3. A hydraulic mount according to claim 2 wherein the valve body includes an annular wall having a terminal end that is received within the recess and includes a step that carries a first seal and wherein the valve body includes a projecting rib that supports a second seal.

4. A hydraulic mount according to claim 3 further comprising a base plate supporting the partition and engaging the elastomeric wall and a second mounting member supporting the base plate, wherein the actuator is captured between the base plate and the second mounting member.

5. A hydraulic mount operable in a soft mode and a firm mode comprising:
   a first mounting element captured by a reinforced elastomeric wall;
   a partition engaging the elastomeric wall and together with the elastomeric wall defining a working chamber wherein the size of the working chamber varies as the elastomeric wall is compressed and expanded by operation of the first mounting element and the partition moving closer together and farther apart, and wherein the partition separates the working chamber from a reservoir and includes an offset portion that forms a recess opening toward the reservoir and wherein a plurality of lateral openings extend through the partition at the recess;
   a relatively flexible diaphragm closing the reservoir, wherein the diaphragm includes an outside surface that is exposed to atmospheric pressure and is surrounded by a base plate;
   a second mounting member supporting the base plate; and
   a valve body including an annular wall having a terminal end that is received within the recess and including a step that carries a first seal and a projecting rib that supports a second seal and providing a normally open fluid path through the partition that opens between the working chamber and the reservoir wherein a fluid is contained in the working chamber, the reservoir and the fluid path, wherein the valve body and the partition together define a control chamber in the fluid path wherein the control chamber is open to the reservoir through a plurality of lateral openings in the valve body so that a first fluid pressure in the control chamber is continuously approximately equal to a second fluid pressure in the reservoir that is approximately at atmospheric pressure.

6. A hydraulic mount according to claim 5 wherein the terminal end is movable across the lateral openings of the partition.

* * * * *